United States Patent
Oliver

(10) Patent No.: US 7,214,156 B2
(45) Date of Patent: May 8, 2007

(54) START AND OPERATION SEQUENCES FOR HYBRID MOTOR VEHICLES

(75) Inventor: James L. Oliver, Orion, MI (US)

(73) Assignee: Eaton Corporation, Cleveland, OH (US)

(*) Notice: Subject to any disclaimer, the term of this patent is extended or adjusted under 35 U.S.C. 154(b) by 121 days.

(21) Appl. No.: 10/872,281

(22) Filed: Jun. 18, 2004

(65) Prior Publication Data
US 2005/0282675 A1 Dec. 22, 2005

(51) Int. Cl.
*F16H 37/06* (2006.01)
(52) U.S. Cl. .............. 475/8; 475/5; 475/151; 180/65.2; 180/65.6; 192/48.4
(58) Field of Classification Search ............ 475/2, 475/5, 8, 150, 151, 153; 477/5; 180/65.2, 180/65.6, 65.7; 192/48.4, 48.5, 48.6, 48.8, 192/48.9, 48.91, 48.92
See application file for complete search history.

(56) References Cited

U.S. PATENT DOCUMENTS

| | | | |
|---|---|---|---|
| 5,433,282 A | 7/1995 | Moroto et al. | |
| 5,934,395 A | 8/1999 | Koide et al. | |
| 6,176,808 B1 | 1/2001 | Brown et al. | |
| 6,202,776 B1 | 3/2001 | Masberg et al. | |
| 6,250,270 B1 | 6/2001 | Ahner et al. | |
| 6,380,640 B1 | 4/2002 | Kanamori et al. | |
| 6,685,591 B2 * | 2/2004 | Hanyu et al. ............... | 475/5 |
| 6,755,266 B2 * | 6/2004 | Lasson .................. | 180/65.4 |
| 2004/0112654 A1 * | 6/2004 | Kozarekar et al. ......... | 180/65.2 |

FOREIGN PATENT DOCUMENTS

| | | |
|---|---|---|
| CH | 269284 | 6/1950 |
| DE | 10100007 | 7/2001 |
| DE | 10148961 | 4/2002 |
| EP | 0676561 | 10/1995 |
| FR | 544407 | 9/1922 |
| GB | 2358006 | 7/2001 |

OTHER PUBLICATIONS

International Search Report PCT/IB2005/001714.
English Abstract provided for DE 10148961.

* cited by examiner

*Primary Examiner*—David D. Le
(74) *Attorney, Agent, or Firm*—Rader, Fishman & Grauer PLLC

(57) ABSTRACT

A hybrid powertrain system includes a first prime mover having an output, a multi-ratio transmission having an input, and a second prime mover having an output connected to the first prime mover output through a first power path and to the transmission input through a second power path. The first power path receives power from the second prime mover during a first operating mode to drive rotation of the transmission input and the second power path receives power from the second prime mover during a second operating mode to drive rotation of the first prime mover output. The second prime mover output is configured to rotate in a first direction in the first operating mode to transmit power to the first power path and in a second direction in the second operating mode to transmit power to the second power path.

29 Claims, 5 Drawing Sheets

START AND OPERATION SEQUENCES FOR HYBRID MOTOR VEHICLES

BACKGROUND OF THE INVENTION

The present invention relates generally to hybrid motor vehicles and, more particularly, to a hybrid powertrain system adapted for installation in a hybrid motor vehicle. This invention was made with Government support under NREL Subcontract No. ZCL-2-32060-01, Prime Contract DE-AC36-99GO10337 awarded by the Department of Energy. The government has certain rights in this invention.

Automobile manufacturers are constantly working to improve fuel efficiency in motor vehicles. Improvements in fuel efficiency are typically directed toward reducing weight, improving aerodynamics, and reducing power losses through the vehicle powertrain. However, the need to improve fuel efficiency is commonly offset by the need to provide enhanced comfort and convenience to the vehicle operator. As an example, manually-shifted transmissions are more fuel efficient than automatic transmissions due to lower parasitic losses. The higher losses associated with conventional automatic transmissions originate in the torque converter, the plate clutches and the hydraulic pump used to control operation of the hydraulic shift system. However, a vast majority of domestic motor vehicles, for example, are equipped with automatic transmissions due to the increased operator convenience they provide. Recent advances in power-operated shift systems have allowed development of "automated" versions of manual transmissions, which automatically shift between sequential gear ratios without any input from the vehicle operator. Thus, automated manual transmissions provide the convenience of a traditional automatic transmission with the efficiency of a manual transmission.

Passenger vehicle and heavy truck manufacturers are also actively working to develop alternative powertrain systems in an effort to reduce the level of pollutants exhausted into the air by conventional powertrain systems equipped with internal combustion engines. Significant development efforts have been directed to electric and fuel-cell vehicles. Unfortunately, these alternative powertrain systems suffer from several disadvantages and, for all practical purposes, are still under development. However, "hybrid" electric vehicles, which include an internal combustion engine and an electric or hydraulic motor, offer a compromise between traditional internal combustion engine powered vehicles and full electric powered vehicles. These hybrid vehicles are equipped with an internal combustion engine and an electric motor that can be operated independently or in combination to provide motive power to the vehicle.

There are two types of hybrid vehicles, namely, series hybrid and parallel hybrid vehicles. In a series hybrid vehicle, power is delivered to the wheels by the electric motor, which draws electrical energy from a generator or battery. The engine is used in series hybrid vehicles to drive a generator that supplies power directly to the electric motor or charges the battery when the state of charge falls below a predetermined value. In parallel hybrid vehicles, the electric motor and the engine can be operated independently or in combination pursuant to the running conditions of the vehicle.

Typically, the control strategy for such parallel hybrid vehicles utilizes a low-load mode where only the electric motor is used to drive the vehicle, a high-load mode where only the engine is used to drive the vehicle, and an intermediate assist mode where the engine and electric motor are both used to drive the vehicle. However, prior art parallel hybrid powertrain systems are relatively inefficient at transitioning from one mode to another, particularly the transition from low-load mode to high-load mode. Furthermore, a majority of prior art hybrid powertrain systems are designed for use in passenger vehicles that employ a relatively light duty gasoline or diesel engine, as opposed to the relatively heavy duty diesel engines found in over-the-road trucks. While hybrid powertrain systems employing a light duty gasoline or diesel engine may be readily transitioned from one operating mode to another without any perceived transition event by the vehicle operator, prior art powertrain systems employing a heavy duty diesel engine are notoriously unsmooth during the transition from one operating mode to another, particularly when the diesel engine is started. Accordingly, there exists a need for improved hybrid powertrain systems that facilitate an efficient and smooth transition from one operating mode to another, particularly in vehicles that employ a heavy duty diesel engine.

BRIEF SUMMARY OF THE INVENTION

A vehicular hybrid powertrain system is provided that includes a first prime mover having an output shaft, a multi-ratio transmission having an input, and a second prime mover having an output connected to the first prime mover output through a first power path and to the transmission input through a second power path. The first power path is configured to receive power from the second prime mover during a first operating mode to drive rotation of the transmission input and the second power path is configured to receive power from the second prime mover during a second operating mode to drive rotation of the first prime mover output. The second prime mover output is configured to rotate in a first direction in the first operating mode to transmit power to the first power path and in a second direction in the second operating mode to transmit power to the second power path. A method of operating a vehicular hybrid powertrain system is also provided.

BRIEF DESCRIPTION OF THE DRAWINGS

Embodiments of the invention will now be described, by way of example, with reference to the accompanying drawings, wherein.

DETAILED DESCRIPTION OF THE INVENTION

Figure 1:
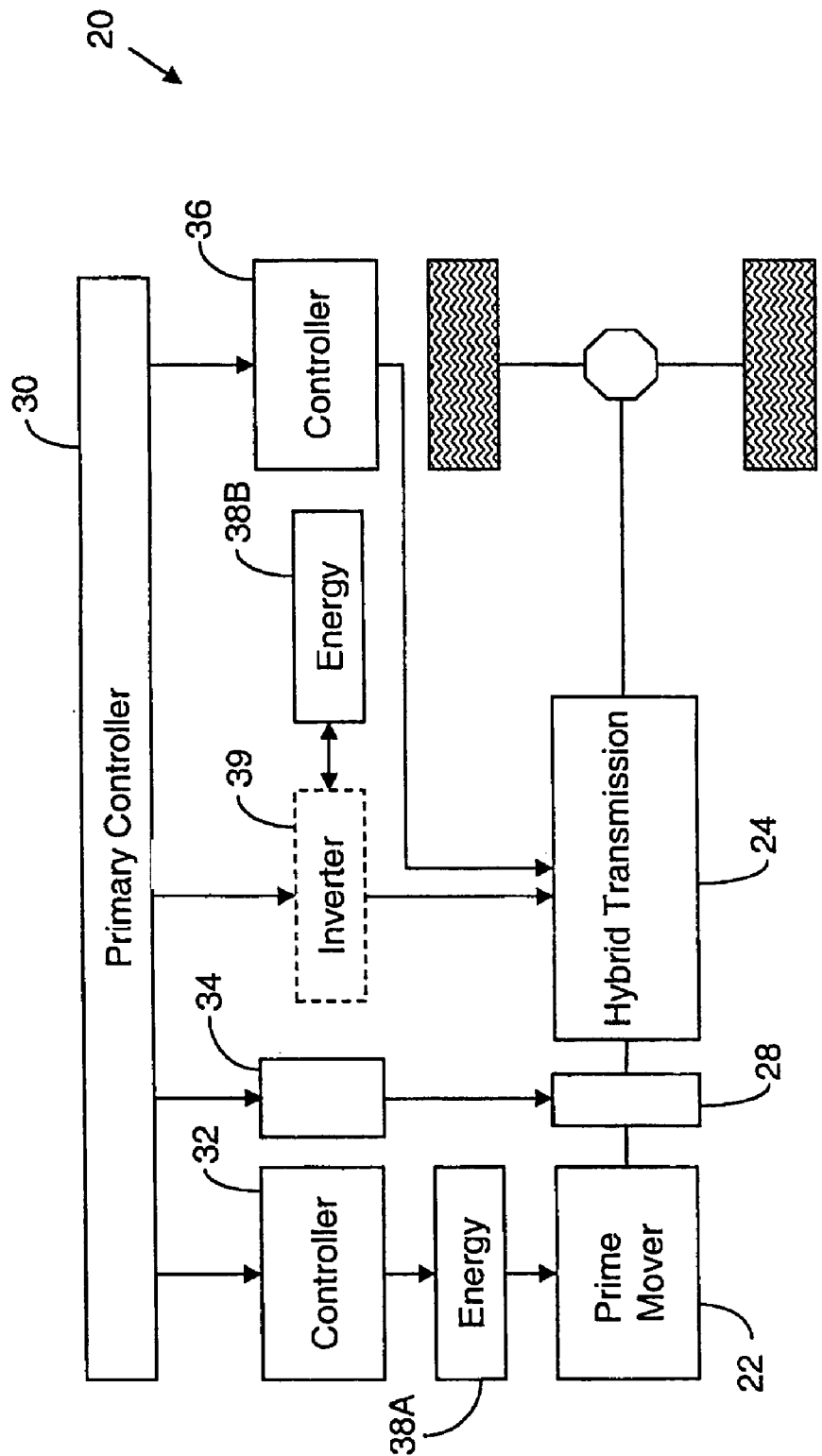
FIG. 1 is a schematic view of a hybrid powertrain system for a motor vehicle.

Referring to FIG. 1, a hybrid powertrain system 20 is shown in accordance with an embodiment of the present invention. In the illustrated embodiment, powertrain system 20 includes a first prime mover 22, such as a spark-ignited or compression-ignited internal combustion engine, and a hybrid transmission 24 that includes a second prime mover 26 (see FIG. 2), such as an electric motor/generator or hydraulic motor/pump. A main clutch 28 is positioned between first prime mover 22 and hybrid transmission 24 to selectively engage/disengage first prime mover 22 from hybrid transmission 24.

To facilitate operation of first prime mover 22 and hybrid transmission 24, powertrain system 20 may include an electronic control unit (ECU) 30 for controlling operation of first prime mover 22, main clutch 28, and hybrid transmission 24. In a particular configuration, ECU 30 includes a programmable digital computer that is configured to receive various input signals, including without limitation, the operating speeds of first and second prime movers 22 and 26, transmission input speed, selected transmission ratio, transmission output speed and vehicle speed, and processes these signals accordingly to logic rules to control operation of powertrain system 20. For example, ECU 30 may be programmed to deliver fuel to first prime mover 22 when first prime mover 22 functions as an internal combustion engine. To support this control, each of first prime mover 22, main clutch 28 and hybrid transmission 24 may include its own controller 32, 34 and 36, respectively. However, it will be appreciated that the present invention is not limited to any particular type or configuration of ECU 30, controllers 32, 34 and 36, or to any specific control logic for governing operation of hybrid powertrain system 20.

In the illustrated embodiment, powertrain system 20 also includes at least one energy storage device 38 for providing energy to operate first and second prime movers 22, 26. For example, energy storage device 38A may contain a hydrocarbon fuel when first prime mover 22 functions as an internal combustion engine. In another example, energy storage device 38B may include a battery, a bank of batteries or a capacitor when second prime mover 26 functions as an electric motor/generator. When so configured, the electric motor-generator may be provided in electrical communication with electrical storage device 38B through a drive inverter 39, as is known in the art. Alternatively, energy storage device 38B may function as a hydraulic accumulator when second prime mover 26 functions as a hydraulic motor/pump.

Figure 2:
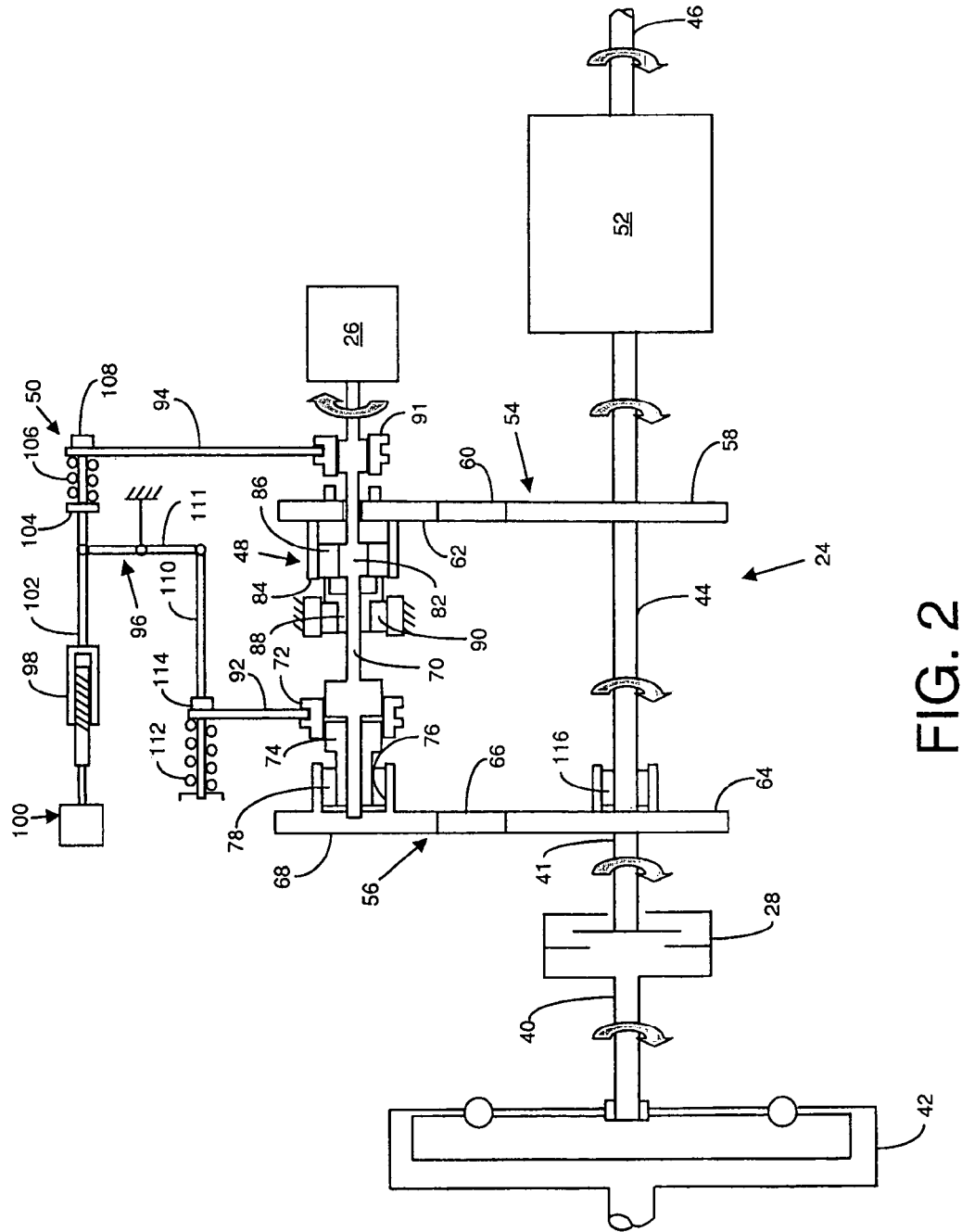
FIG. 2 is a schematic view of a multi-ratio hybrid transmission according to an embodiment of the present invention and adapted for use in the hybrid powertrain system shown in FIG. 1.
Figure 3:
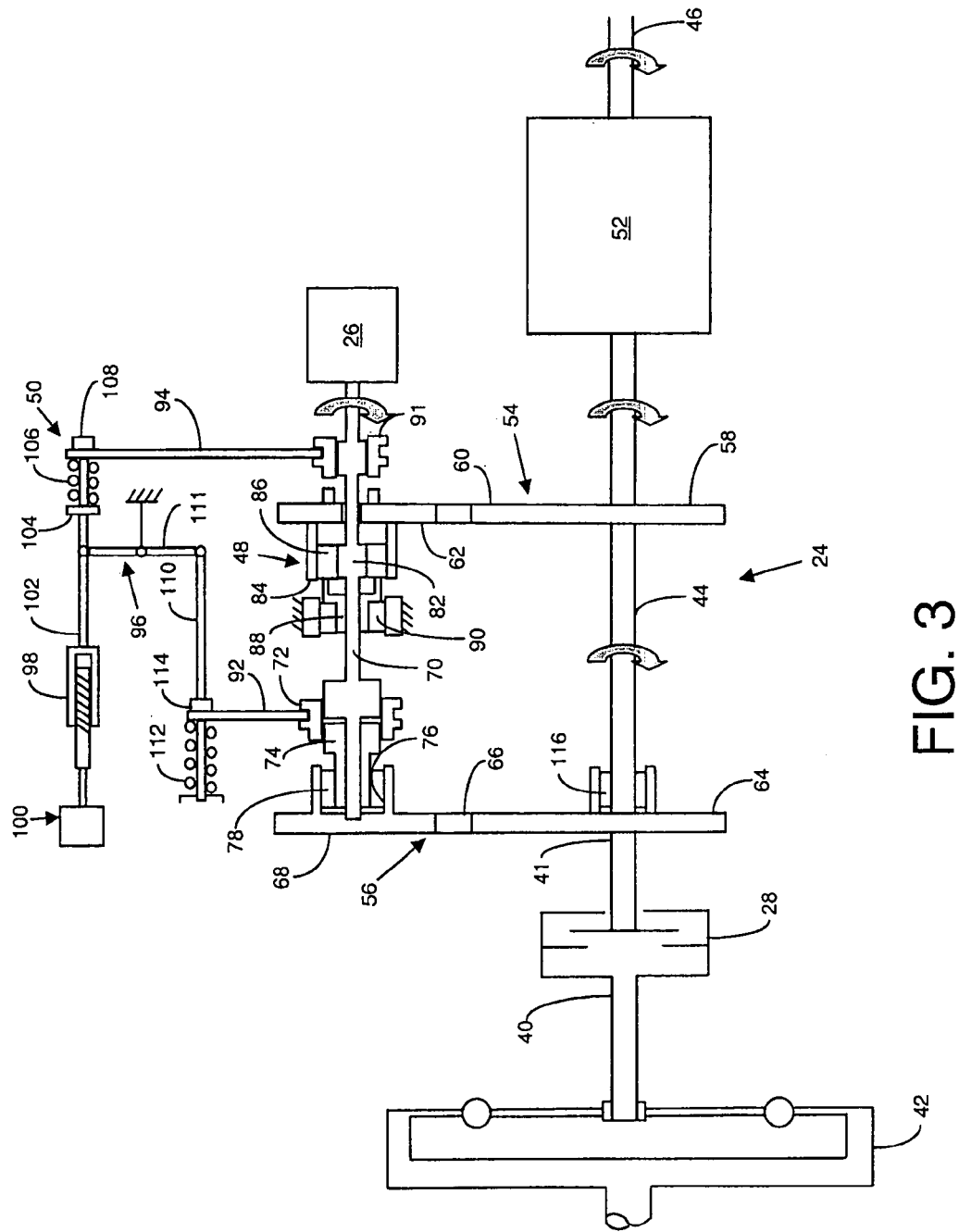
FIG. 3 is a schematic view of a multi-ratio hybrid transmission of FIG. 2, shown during a second mode of operation.
Figure 4:
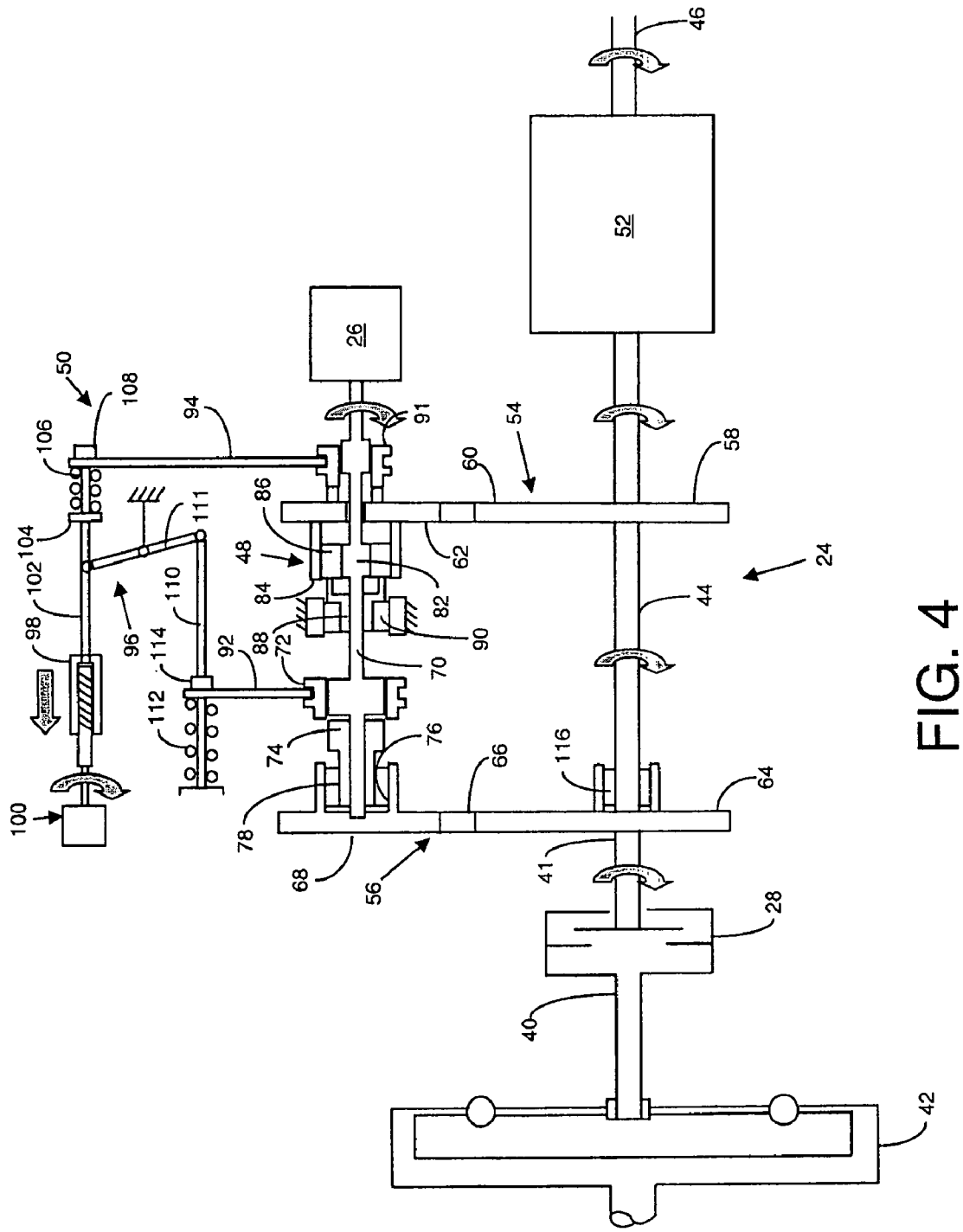
FIG. 4 is a schematic view of a multi-ratio hybrid transmission of FIG. 2, shown during a third mode of operation.

With reference to FIGS. 2–4 of the accompanying drawings, the components and function of hybrid transmission 24 will now be described in greater detail. In an embodiment, hybrid transmission 24 is connected to the output of first prime mover 22 by main clutch 28, which includes a first main clutch shaft 40 and a second main clutch shaft 41 (which also functions as the first prime mover output shaft when no main clutch is used). For illustration, prime mover 22 is shown as an internal combustion engine in FIGS. 2–4, which generally includes a flywheel 42 for reference. In addition to second prime mover 26, hybrid transmission 24 also includes an input shaft 44, an output shaft 46, a planetary gearset 48, a control mechanism 50 and a multi-ratio transmission 52. Multi-ratio transmission 52 may include a number of interchangeable gear ratios, as found in any number of change-gear transmissions known in the art, or may include a less traditional power transmission system, such as a continuously variable transmission ("CVT").

In an embodiment, hybrid transmission 24 also includes first and second power paths 54, 56 for transmitting power between second prime mover 26 and second main clutch shaft 41 and/or transmission input shaft 44. As shown in FIG. 2, first power path 54 may include a first gear train having an input shaft gear 58 secured for rotation with input shaft 44, a first pinion gear 60 and a first headset gear 62. Similarly, second power path 56 may include a second gear train having a main clutch shaft gear 64 secured for rotation with main clutch shaft 41, a second pinion gear 66 and a second headset gear 68. In an embodiment, first power path 54 is approximately 98% the ratio of second power path 56 to prevent undesirable gear lock-up during operation of hybrid transmission 24. Alternatively, first and second power paths 54, 56 may include a chain or belt between input shaft gears 58, 64 and headset gears 62, 68, in which case pinion gears 60, 66 would not be needed.

Second prime mover 26 is connected to a countershaft 70, upon which first and second headset gears 62, 68 are rotatably supported. Countershaft 70 and second prime mover 26 are selectively connected for rotation with second headset gear 68 by a single acting synchronizer clutch 72, which is axially movable to connect a collar 74 rotatably supported on countershaft 70 to countershaft 70 itself. To support collar 74, second headset gear 68 may include a generally cylindrical receptacle 76 within which collar 74 is received. Because collar 74 and countershaft 70 are rotatably supported by second headset gear 68, a first overrunning clutch 78 is positioned between receptacle 76 and collar 74 to selectively secure collar 74 for rotation with second headset gear 68. The term "overrunning clutch" includes, without limitation, various automated and power-operated, single or dual-mode clutches; wherein operation in an "engaged" mode results in a single or bi-directional clutching action and operation in a "disengaged" mode permits freewheeling in one or both rotational directions. Thus, when clutch 76 is in an "engaged" mode, collar 74 is secured for rotation with second headset gear 68 in at least one rotational direction.

Second prime mover 26 is selectively connectable to first power path 54 through planetary gearset 48. When so configured, countershaft 70 includes a sun gear 82 secured for rotation therewith and first headset gear 62 includes a ring gear portion 84 fixed to rotate with first headset gear 62. Between sun gear 82 and ring gear portion 84 are a number of planet gears 86 meshed with sun gear 82 and ring gear portion 84. Planet gears 86 are rotatably supported by a planet carrier 88, which in turn is rotatably supported by a second overrunning clutch 90 that is secured to a transmission housing or other fixed structural component. Second prime mover 26 is also selectively connectable to first power path 54 through a jaw clutch 91, which is axially movable on countershaft 70 to secure countershaft 70 for rotation with first headset gear 62.

To facilitate the connection of second prime mover 26 to first or second power path 54, 56 via jaw clutch 91 or synchronizer clutch 72, respectively, hybrid transmission 24 may also include clutch control mechanism 50 for controlling movement of clutches 72 and 91. In the illustrated embodiment, which is not intended to limit the scope of the invention, clutch control mechanism 50 is a kinematic mechanism that includes a pair of spring biased lever arms 92, 94 and linkage 96 that couples lever arms 92, 94 for movement with a screw member 98 that forms a portion of a motor-driven screw actuator 100. In a particular configuration, linkage 96 includes a first linkage member 102 that extends through a support member 104, which may be secured to the transmission housing or other fixed structure, and lever arm 94 and terminates in an end cap 108. A resiliently compressible member 106, such as a compression spring, is positioned between lever arm 94 and support member 104 to apply a biasing force against lever arm 94 toward end cap 108. Similarly, a second linkage member 110 is moveably linked to first linkage member 102 via a pivotable link 111, which is secured to the transmission housing or other fixed structure proximate its midsection. A second resiliently compressible member 112 biases lever arm 94 against a stop 114. As shown in FIG. 4, the motor driven screw actuator 100 may be rotated to draw screw member 98 and first linage member 102 closer to actuator 100, thereby effecting axial movement in lever arms 92, 94 and their corresponding clutch.

As shown in FIG. 2, planetary gearset 48 is arranged so that when second prime mover 26 is operating to rotate countershaft 70 in a first angular direction (such as the counterclockwise direction illustrated in FIG. 2) and overrunning clutch 90 is "engaged", planet carrier 88 is prohibited from rotating causing the rotational power from countershaft 70 to be transmitted through planetary gears 86 and into ring gear portion 84 at a predetermined gear ratio (typically a gear reduction). Rotational power is transmitted into first power path 54 through first headset gear 62 and then into multi-ratio transmission 52 through transmission input shaft 44. In this mode of operation, second prime mover 26 may be operated to smoothly launch a vehicle employing hybrid transmission 24 without the assistance of first prime mover 22.

When a predetermined vehicle speed is achieved, the system may be operated to transmit power from second prime mover 26 to first prime mover 22 by reversing the rotation of countershaft 70 (see, e.g., FIG. 3). This feature allows overrunning clutch 90 to be disengaged, planetary gearset 48 to freewheel, and overrunning clutch 78 to be engaged, all of which occur at roughly 0 RPM of the countershaft. Rotational power may then be transferred from second prime mover 26 through countershaft 70 and into second power path 56 via second headset gear 68. More particularly, rotational power is transmitted from countershaft 70 into collar 74 through synchronizer clutch 72 and from collar 74 into second headset gear 68 through the engaged overrunning clutch 78. The rotational power produced by second prime mover 26 is then transmitted from second power path 56 into second main clutch shaft 41. Provided main clutch 28 is engaged, power may be transferred through main clutch 28 into first prime mover 22 through first main clutch shaft 40. A third overrunning clutch 116 may be positioned between second main clutch shaft 41 and transmission input shaft 44 to allow for different rotational speeds between the two shafts. In this mode of operation, rotational power from second prime mover 26 may be used to start first prime mover 22 functioning as an internal combustion engine.

When second prime mover functions as an electric motor/generator or a hydraulic motor/pump, rotation of countershaft 70 may be quickly reversed to facilitate the transfer of power from first power path 54 to second power path 56. Thus, when the motor speed decreases to zero (during the transition from one rotating direction to another) and then begins to increase in the other direction, overrunning clutch 78 engages and begins cranking the engine and driving it toward the speed of transmission input shaft 44 that is being maintained by vehicle inertia. When first prime mover 22 starts, the speed of first prime mover 22 is quickly increased under the assistance of second prime mover 26, which provides for a relatively smooth start and engine acceleration sequence. This feature is particularly useful in powertrain systems that employ heavy duty diesel engines that start roughly and slowly increase in speed when not assisted, to smoothly transition the powertrain system to "parallel" operation. Overrunning clutch 116 may then be engaged when the speed of second main clutch shaft 41 and transmission input shaft 44 are substantially equal. During the time second main clutch shaft 41 is accelerating, there is generally no power being applied to transmission input shaft 44, allowing a gear ratio change to occur between a first gear ratio and a second gear ratio (or between any other gear ratios). In a vehicle employing an internal combustion engine as the first prime mover and an electric/hydraulic motor as the second prime mover 26, the above event results in a smooth and efficient switch from all electric/hydraulic drive, to engine-electric/hydraulic parallel drive, all while starting the engine and conducting a gear ratio change in the transmission virtually simultaneously.

Overrunning clutch 116 may be configured as a one-way clutch, which allows "positive" driveline torque to flow through clutch 116 in a direction from first prime mover 22 toward multi-ratio transmission 52 and prevents torque-flow in the opposite direction (so called "negative" driveline torque). This feature allows first prime mover 22 to be reduced to an idle speed or even shut down anytime it is not providing positive driveline torque. Overrunning clutch 116 also isolates first prime mover 22 during the start sequence to ensure no driveline reaction torque is imposed thereon (e.g., no negative torque, compression pulses, etc.).

In conventional non-hybrid powertrain systems, negative driveline torque is absorbed by the vehicle engine and/or brakes and is therefore lost energy. However, in hybrid transmission 24, this torque may be used to drive rotation of second prime mover 26 operating as a generator or pump to create and store energy in energy storage device 38B. Moreover, engine braking may be emulated, which may be desirable, if energy storage device 38B is at capacity. Clutch 216 may remain engaged and normal engine braking will occur. Particularly, synchronizer clutch 72 may be disengaged and jaw clutch 91 may be engaged to directly connect countershaft 70 with first headset gear 62. In this mode of operation, negative driveline torque may be transmitted from transmission input shaft 44 through first power path 54 and into second prime mover 26 via countershaft 70.

Additionally, when less than full power is being requested from first prime mover 22, a portion of the power generated by first prime mover 22 and applied to multi-gear transmission 52 through input shaft 44 may be routed through first power path 54 and into second prime mover 26 via either planetary gearset 48 or jaw clutch 91. In this mode of operation, the routed power from first prime mover 22 may be used to drive second prime mover 26 functioning as a generator or pump to store energy in energy storage device 38B. This mode of operation may occur at any time during operation of first prime mover 22, even when the vehicle is at rest and the transmission 52 is in neutral. Furthermore, when second prime mover 26 functions as an electric generator, first prime mover 22 may be used to selectively drive second prime mover 26 to supply electric power for on-board or off-board electrical equipment via the existing drive inverter. Similarly, when second prime mover 26 functions as a hydraulic pump, first prime mover 22 may be used to selectively drive second prime mover 26 to provide fluid power for on-board or off-board hydraulic equipment.

While the features of the present invention are particularly suited for transitioning between operating sequences while the vehicle is moving, it is possible to operate second prime mover 26 to start first prime mover 22 functioning as an engine while the vehicle is at rest and then launch the vehicle solely under the power of first prime mover 22 or under parallel power (i.e., combined power of first and second prime movers 22, 26). Optionally, when second prime mover 26 is directly connected to first power path 54 via planetary gearset 48, first prime mover 22 may be shut down and the vehicle operated solely under the power of second prime mover 26, provided second prime mover 26 is appropriately configured for this mode of operation.

Figure 5:
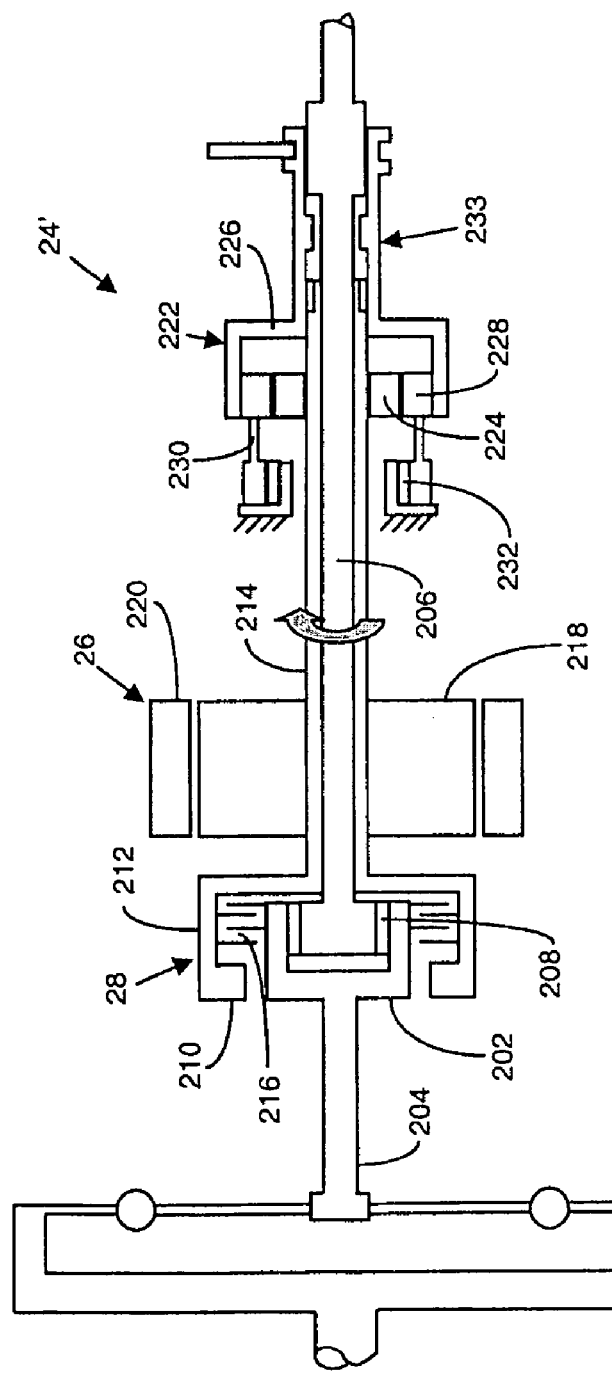
FIG. 5 is a schematic view of a multi-ratio hybrid transmission according to another embodiment of the present invention and adapted for use in the hybrid powertrain system shown in FIG. 1.
Figure 6:
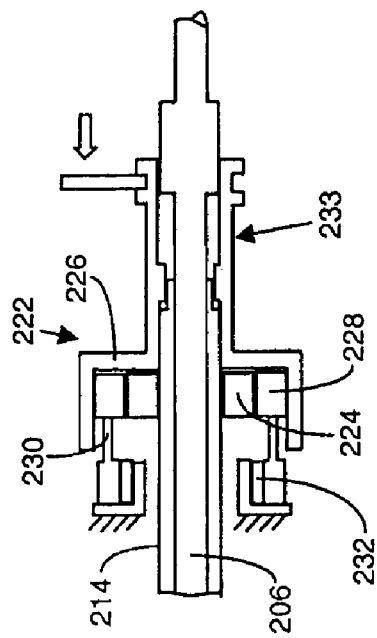
FIG. 6 is a detailed view of the multi-ratio hybrid transmission of FIG. 5.

Referring to FIGS. 5 and 6, another embodiment of hybrid powertrain system 20 is shown that includes a hybrid transmission 24'. In the illustrated embodiment, main clutch 28 includes first clutch portion 202 having a main clutch input shaft 204 and a main clutch output shaft 206, which also functions as the input shaft to multi-ratio transmission 52 (not shown in FIGS. 5 and 6). A portion of main clutch output shaft 206 is rotatably supported within a portion of main clutch input shaft 204 by an overrunning clutch 208. Main clutch 28 also includes a second clutch portion 210 having a housing member 212 that surrounds at least a portion of first clutch portion 202 and an output shaft 214 that surrounds main clutch output shaft 206 and is concentric with respect thereto. Second clutch portion 210 includes a clutch 216, such as a hydraulically or electrically operated friction clutch.

Second prime mover 26 is shown in FIG. 5 as an electric motor/generator having a rotor 218 secured for rotation with output shaft 214 and a stator 220. However, other sources of motive power may be used in place of an electric motor/generator, such as a hydraulic motor/pump. In hybrid transmission 24', second prime mover 26 is selectively connectable to main clutch output shaft 206 through a planetary gearset 222. When so configured, output shaft 214 includes a sun gear 224 secured for rotation therewith and main clutch output shaft 206 includes an axially moveable ring gear 226, a portion of which is splined for rotation with main clutch output shaft 206. Between sun gear 224 and ring gear 226 are a number of planet gears 228 meshed with sun gear 224 and ring gear 226. Planet gears 228 are rotatably supported by a planet carrier 230, which in turn is rotatably supported by an overrunning clutch 232 that is secured to the transmission housing or other fixed structure. Second prime mover 26 is also selectively connectable to main clutch output shaft 206 through ring gear 226, which includes a tongue and groove type arrangement 233 or other interlocking arrangement that locks output shaft 214 for rotation with main clutch output shaft 206 when ring gear 226 is moved from the "unlocked" position shown in FIG. 5 to the "locked" position shown in FIG. 6. Ring gear 226 may be moved by an actuator mechanism (not shown), such as a mechanism similar to the one shown in FIGS. 2–4.

As shown in FIG. 5, planetary gearset 222 is arranged so that when second prime mover 26 is operating to rotate output shaft 214 in a first direction (such as the counter-clockwise direction illustrated in FIG. 5) and clutches 208 and 216 are "disengaged", planet carrier 230 is prohibited from rotating by "engaging" clutch 232, causing the rotational power from output shaft 214 to be transmitted through planet gears 228 and into ring gear 226 at a predetermined gear ratio. Rotational power is transmitted into main clutch output shaft 206 through ring gear 226 and then into multi-ratio transmission 52. In this mode of operation, second prime mover 26 may be operated to launch a vehicle employing hybrid transmission 24' without the assistance of first prime mover 22.

When the desired vehicle speed is achieved, the rotation of output shaft 214 is reversed (see, e.g., FIG. 6), allowing overrunning clutch 232 to be "disengaged", planetary gearset 222 to freewheel and clutch 208 to be "engaged". Rotational power may then be transferred from second prime mover 26 through output shaft 214 and into main clutch input shaft 204 via clutch 208. In this mode of operation, rotational power from second prime mover 26 may be used to start first prime mover 22 functioning as an internal combustion engine.

When second prime mover 26 functions as an electric motor/generator or a hydraulic motor/generator, rotation of output shaft 214 may be quickly reversed to facilitate the transfer of power from main clutch output shaft 206 to main clutch input shaft 204. Thus, when the motor speed decreases to zero (during the transition from one rotating direction to another) and then begins to increase in the other direction, clutch 216 picks the engine up and begins cranking it and driving it toward the speed of the transmission input shaft (main clutch output shaft 206), which is being maintained by vehicle inertia. When first prime mover 22 starts, the speed of first prime mover 22 is quickly increased under the assistance of second prime mover 26, which provides for a relatively smooth start and engine acceleration sequence. Clutch 208 engages when the speed of main clutch input shaft 204 and main clutch output shaft 206 are substantially equal. During the time main clutch input shaft 204 is accelerating, there is generally no power being applied to main clutch output shaft 206, allowing a gear ratio change to occur in multi-ratio transmission 52. In a vehicle employing an internal combustion engine as the first prime mover and an electric/hydraulic motor as the second prime mover 26, the above event results in a smooth and efficient switch from all electric/hydraulic drive, to engine-electric/hydraulic parallel drive, all while starting the engine and conducting a gear ratio change in the transmission virtually simultaneously.

Clutch 208 is a one-way clutch, which allows "positive" driveline torque to flow through clutch 208 in a direction from first prime mover 22 toward hybrid transmission 52 and prevents torque-flow in the opposite direction. Clutch 216 can remain engaged if desired to provide torque flow in the opposite direction. However, when clutch 216 is disengaged, clutch 208 acts in its capacity as a one way clutch. The nature of clutch 208 allows first prime mover 22 to be reduced to an idle speed or shut down any time it is not providing positive driveline torque. As noted above, in conventional non-hybrid drivetrains, negative driveline torque is absorbed by the vehicle engine and/or brakes and is therefore lost energy. However, in hybrid transmission 24', this torque may be absorbed by the second prime mover 26 and used to drive rotation of second prime mover 26 operating as a generator or pump to create and store energy in energy storage device 38B. At the same time, prime mover 26 may also emulate engine braking and the engine braking feature may be desired, if storage device 38B has reached capacity. Clutch 216 may remain engaged and normal engine braking will occur. Otherwise, clutches 208, 216 and 232 may be disengaged and ring gear 226 moved (as shown in FIG. 6) to directly connect output shaft 214 for rotation with main clutch output shaft 206 through tongue and groove arrangement 233. In this mode of operation, negative driveline torque may be transmitted from main clutch output shaft 206 into second prime mover 26 via output shaft 214. Optionally, when second prime mover 26 is directly connected to main clutch output shaft 206 via output shaft 214, first prime mover 22 may be shut down and the vehicle operated solely under the power of second prime mover 26, provided the motor is appropriately configured for this mode of operation.

Among other features, hybrid transmission 24, 24' may be readily installed in an existing vehicle driveline. Once installed, the present invention provides for rolling engine start features in hybrid vehicles and allows the vehicle to be operated solely under the power of second prime mover 26, while maintaining the normal operating characteristics of the vehicle driveline, such as normal vehicle clutching and/or automated transmission operation. Further, when the first prime mover torque, planet gearset ratio, and second prime mover torque are properly matched, a desirable and tailored feel can be achieved at the time when first prime mover, second prime mover and the driveline come together in parallel operation. This feature is accomplished, for example, by configuring hybrid powertrain system such that the sum of the first and second prime mover torque is substantially similar to second prime mover torque times the planetary gearset ratio.

The hybrid powertrain system of the present invention also provides for the shortest possible torque interruption during an engine start-up sequence. This feature is supported by the electric/hydraulic motor's ability to reverse direction quickly to change modes of operation, which includes a gear ratio change, rather than using more traditional clutches that have to be trimmed and controlled. Thus, first prime mover 22 operating as a heavy duty diesel engine may be started and brought up to operating speed without the roughness experienced in non-motor assisted diesel engine start and acceleration sequences.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A vehicular hybrid powertrain system, comprising:
a first prime mover having an output;
a multi-ratio transmission having an input;
a second prime mover having an output selectively operably connected to the transmission input trough a first power path and to the first prime mover output through a second power path, the first power path selectively configured to receive power from the second prime mover during a first operating mode to drive rotation of the transmission input and the second power path selectively configured to receive power from the second prime mover during a second operating mode to drive rotation of the first prime mover output; and
wherein the second prime mover output is selectively configured to rotate in a first direction in the first operating mode to transmit power to the first power path and in a second direction opposite the first direction in the second operating mode to transmit power to the second power path.

2. The hybrid powertrain system of claim 1, wherein the first mode of operation includes launching the vehicle in a first transmission ratio solely under the power produced by the second prime mover.

3. The hybrid powertrain system of claim 1, wherein the second mode of operation includes starting the first prime mover when the first prime mover is an internal combustion engine, changing the transmission ratio (torn a first transmission ratio to a second transmission ratio and operating the first and second prime movers in parallel.

4. The hybrid powertrain system of claim 1, wherein the first and second power paths are gear trains.

5. The hybrid powertrain system of claim 1 further including a second prime mover driven countershaft for transmitting power from the second prime mover to the first and second power paths.

6. The hybrid powertrain system of claim 5 further including a second axially moveable clutch for selectively interconnecting the countershaft and the first power path.

7. The hybrid powertrain system of claim 5 further including a first overrunning clutch positioned between the countershaft and the second power path, wherein the first overrunning clutch is operable in a first clutch mode and a second clutch mode, the first overrunning clutch selectively configured to engage and transmit power from the second prime mover to the second power path when the first overrunning clutch is in the second clutch mode, and to disengage and prohibit power from being transmitted from the second prime mover to the second power path when the first overrunning clutch is operating in the first clutch mode.

8. The hybrid powertrain system of claim 7 further including a collar rotatably supported on the countershaft between the first overrunning clutch and the countershaft.

9. The hybrid powertrain system of claim 8 further including a first axially movable clutch adapted to selectively secure the collar for rotation with the countershaft.

10. The hybrid powertrain system of claim 5 further including a planetary gearset selectively interconnecting the countershaft and the first power path.

11. The hybrid powertrain system of claim 10, wherein the planetary gearset includes a third overrunning clutch selectively configured to engage when the countershaft is rotating in the first direction to transmit power through the planetary gearset and into the first power path and to disengage when the countershaft is rotating in the second direction.

12. The hybrid powertrain system of claim 5 further including a second overrunning clutch positioned between the first prime mover output end the transmission input, the second overrunning clutch selectively configured to engage and transmit power between the first prime mover output and the transmission input when the first prime mover output and the transmission input are rotating at a first predetermined speed and to disengage and prohibit power from being transmitted between the first prime mover output and the transmission input when the first prime mover output and the transmission input are rotating at a second predetermined speed.

13. The hybrid powertrain system of claim 12, wherein the second overrunning clutch is selectively configured to engage when the transmission input speed is substantially equal to the first prime mover output speed.

14. A vehicular hybrid powertrain system, comprising:
a first prime mover having an output;
a multi-ratio transmission having an input;
a second prime mover selectively operably connected to the transmission input through a first power path and to the first prime mover output through a second power path, the first power path selectively configured to receive power from the second prime mover during a first operating mode to drive rotation of the transmission input and the second power path selectively configured to receive power from the second prime mover during a second operating mode to drive rotation of the first prime mover output;
a second prime mover driven countershaft for transmitting power from the second prime mover to the first and second power paths;
a first overrunning clutch positioned between the countershaft and the second power path and operable in a first overrunning clutch first mode and a first overrunning clutch second mode, the first overrunning clutch selectively configured to engage and transmit power from the second prime mover to the second power path when the first overrunning clutch is in the first overrunning clutch second mode, and to disengage and prohibit power from being transmitted from the second prime mover to the second power path when the first overrunning clutch is operating in the first overrunning clutch first mode;
a second overrunning clutch positioned between the first prime mover output and the transmission input, the second overrunning clutch selectively configured to engage and transmit power between the first prime mover output and the transmission input when the first prime mover output and the transmission input are rotating at a first predetermined speed and to disengage and prohibit power from being transmitted between the first prime mover output and the transmission input when the first prime mover output and the transmission input are rotating at a second predetermined speed; and
wherein the second prime mover is selectively configured to rotate the countershaft in a first direction in the first operating mode to transmit power to the first power path and in a second direction opposite the first direction in the second operating mode to transmit power to the second power path when the first overrunning clutch is in the first overrunning clutch second mode.

15. The hybrid powertrain system of claim 14, wherein the first mode of operation includes launching the vehicle in a first transmission ratio solely under the power produced by the second prime mover.

16. The hybrid powertrain system of claim 14, wherein the second mode of operation includes starting the first prime mover when the first prime mover is an internal combustion engine, changing the transmission ratio from a first transmission ratio to a second transmission ratio and operating the first and second prime movers in parallel.

17. The hybrid powertrain system of claim 14, wherein the second. clutch is selectively configured to engage when the transmission input speed is substantially equal to the first prime mover output speed.

18. The hybrid powertrain system of claim 14 further including a second axially removeable clutch for selectively interconnecting the countershaft and the first power path.

19. The hybrid powertrain system of claim 14, wherein the first and second power paths are gear trains.

20. The hybrid powertrain system of claim 14 further including a planetary gearset selectively interconnecting the countershaft and the first power path.

21. The hybrid powertrain system of claim 20, wherein the planetary gearset includes a third overrunning clutch selectively configured to engage when the countershaft is rotating in the first direction to transmit power through the planetary gearset and into the first power path and to disengage when the countershaft is rotating in the second direction.

22. A method of operating a vehicular hybrid powertrain system, comprising:
providing a first prime mover having an output a multi-ratio transmission having an input, and a second prime mover having an output selectively operably connected to the transmission input through a first power path and to the first prime mover output through a second power path, the first power path selectively configured to receive power from the second prime mover during a first operating mode to drive rotation of the transmission input and the second power path selectively configured to receive power from the second prime mover during a second operating mode to drive rotation of the first prime mover output;
rotating the output of the second prime mover in a first direction during the first mode of operation to drive rotation of the transmission input; and
rotating the output of the second prime mover in a second direction opposite the first direction during the second mode of operation to drive rotation of the first prime mover output.

23. The method of claim 22, wherein the first mode of operation includes launching the vehicle in a first transmission ratio.

24. The method of claim 22, wherein the second mode of operation includes starting the first prime mover when the first prime mover is an internal combustion engine, changing the transmission ratio from a first transmission ratio to a second transmission ratio and operating the first and second prime movers in parallel.

25. A method of operating a vehicular hybrid powertrain system, comprising:
providing a first prime mover having an output, a multi-ratio transmission having an input, and a second prime mover having an output selectively operably connected to the transmission input through a first power path and to the first prime mover output through a second power path, the first power path selectively configured to receive power from the second prime mover during a first operating mode to drive rotation of the transmission input and the second power path selectively configured to receive power from the second prime mover during a second operating mode to drive rotation of the first prime mover output,
providing a second prime mover driven countershaft for transmitting power from the second prime mover to the first and second power paths, a first overrunning clutch positioned between the countershaft and the second power path, the first overrunning clutch selectively configured to engage and transmit power from the second prime mover to the second power path when the first overrunning clutch is operating in a first overrunning clutch first mode and to disengage and prohibit power from being transmitted from the second prime mover to the second power path when the first overrunning clutch is operating in a first overrunning clutch second mode, and a second overrunning clutch positioned between the first prime mover output and the transmission input, the second overrunning clutch selectively configured to engage and transmit power between the first prime mover output and the transmission input when the first prime mover output and the transmission input are rotating at a first predetermined speed and to disengage and prohibit power from being transmitted between the first prime mover output and the transmission input when the first prime mover output and the transmission input are rotating at a second predetermined speed;

rotating the output of the second prime mover in a first direction during the first mode of operation to drive rotation of the transmission input; and engaging the first overrunning clutch and rotating the output of the second prime mover in a second direction opposite the first direction during the second mode of operation to drive rotation of the first prime mover output.

26. The method of claim 25, wherein the first mode of operation includes launching the vehicle in a first transmission ratio.

27. The method of claim 25, wherein the second mode of operation includes starting the first prime mover when the first prime mover is an internal combustion engine, changing the transmission ratio from a first transmission ratio to a second transmission ratio and operating the first and second prime movers in parallel.

28. The method of claim 25, further including engaging the second overrunning clutch when the speed of the first prime mover output and the transmission input are substantially equal.

29. The method of claim 25, the second prime mover selectively absorbing negative drive-in torque, the negative drive-in torque providing at least one of power generation and emulated engine braking.

* * * * *

UNITED STATES PATENT AND TRADEMARK OFFICE
CERTIFICATE OF CORRECTION

PATENT NO.        : 7,214,156 B2                                     Page 1 of 1
APPLICATION NO. : 10/872281
DATED             : May 8, 2007
INVENTOR(S)       : James L. Oliver It is certified that error appears in the above-identified patent and that said Letters Patent is hereby corrected as shown below:

In Column 9, line 59, "trough" should be --through--.

In Column 10, line 14, "(torn" should be --from--.

In Column 10, line 54, "end" should be --and--.

In Column 11, line 58, remove "." after --second--.

In Column 11, line 62, "removeable" should be --moveable.--

In Column 12, line 13, please insert --,-- after "having an output."

In Column 14, line 16, "drive-in" should be -- driveline--.

Signed and Sealed this

Ninth Day of October, 2007

JON W. DUDAS
*Director of the United States Patent and Trademark Office*